United States Patent [19]

Ohara

[11] Patent Number: 5,317,434
[45] Date of Patent: May 31, 1994

[54] COLOR FILTER STRUCTURE FOR LIQUID CRYSTAL DISPLAYS WITH SEAL END ON OR SURROUNDED BY ORIENTATION FILM

[75] Inventor: Hiroshi Ohara, Nagano, Japan
[73] Assignee: Seiko Epson Corporation, Tokyo, Japan
[21] Appl. No.: 730,180
[22] Filed: Jul. 12, 1991
[30] Foreign Application Priority Data
  Jul. 12, 1990 [JP] Japan ................ 184810
[51] Int. Cl.⁵ ............... G02F 1/1335; G02F 1/1333; G02F 1/1337; G02F 1/1339
[52] U.S. Cl. ................... 359/68; 359/74; 359/75; 359/80
[58] Field of Search ............ 359/68, 74, 75, 62, 359/80

[56] References Cited

U.S. PATENT DOCUMENTS

| | | | |
|---|---|---|---|
| 4,597,637 | 7/1986 | Ohta | 359/68 |
| 4,744,637 | 5/1988 | Sekimura et al. | 359/68 |
| 4,799,776 | 1/1989 | Yamazaki et al. | 359/68 |
| 4,802,743 | 2/1989 | Takao et al. | 359/68 |
| 4,929,060 | 5/1990 | Sugimoto et al. | 359/68 |
| 5,042,920 | 8/1991 | Yoshino et al. | 359/68 |
| 5,045,418 | 9/1991 | Fukuyoshi | 359/68 |
| 5,079,214 | 1/1992 | Long et al. | 359/68 |
| 5,128,786 | 7/1992 | Yaragisawa | 359/68 |
| 5,194,976 | 3/1993 | Nakano et al. | 359/75 |

FOREIGN PATENT DOCUMENTS

| | | |
|---|---|---|
| 58-178325 | 10/1983 | Japan. |
| 59-121316 | 7/1984 | Japan. |
| 62-153826 | 7/1987 | Japan. |
| 63-008633 | 1/1988 | Japan. |
| 1-050027 | 2/1989 | Japan. |
| 2-082222 | 3/1990 | Japan. |
| 2284117 | 11/1990 | Japan ............ 359/68 |
| 2287321 | 11/1990 | Japan ............ 359/68 |

Primary Examiner—William L. Sikes
Assistant Examiner—Anita Pellman Gross
Attorney, Agent, or Firm—Raymond J. Werner

[57] ABSTRACT

A structure provides for encapsulating a color filter in a planarized protective coating, forming a transparent electrode on the planar surface of the protective coating and forming an orientation film over the transparent electrode wherein the orientation film extends beyond the boundary defined by the seal between the two substrates of a liquid crystal device. The seal itself can be attached at one of its ends to the orientation film, or it can be attached at one of its ends to a portion of the transparent electrode such that that end is surrounded by the abutting orientation film. In both of the seal attachment schemes the other end of the seal is attached directly to one of the substrates. Typically the substrates are glass substrates.

21 Claims, 4 Drawing Sheets

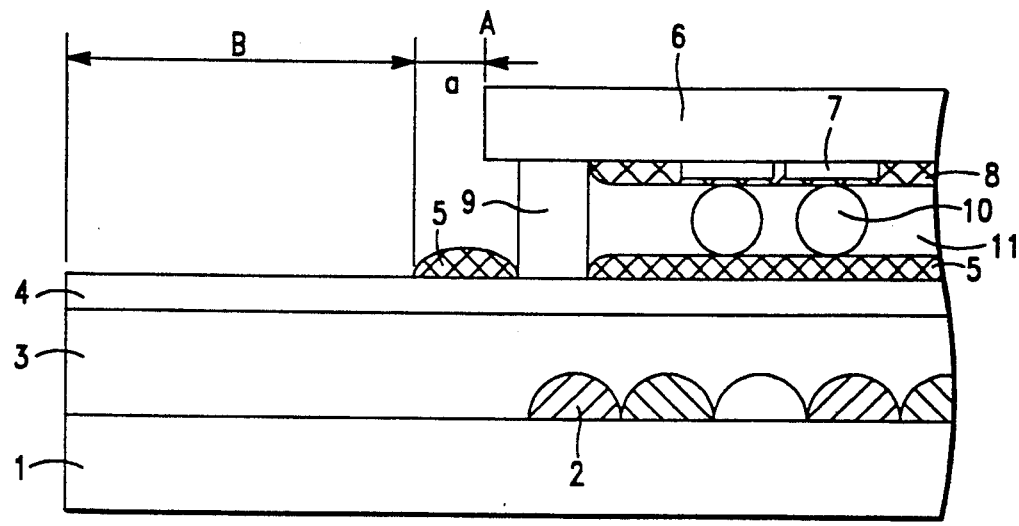
FIG.—6
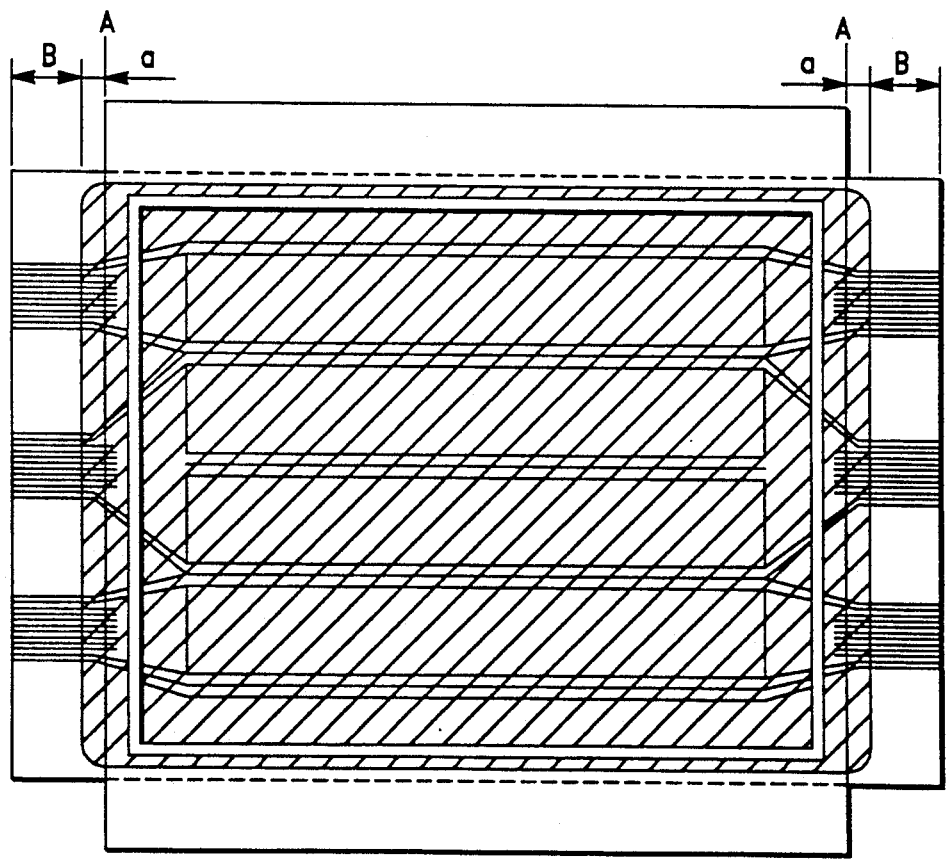
FIG.—7

COLOR FILTER STRUCTURE FOR LIQUID CRYSTAL DISPLAYS WITH SEAL END ON OR SURROUNDED BY ORIENTATION FILM

BACKGROUND OF THE INVENTION

The present invention relates to an electro-optical device, and in particular to an electro-optical device having a color filter layer.

Various methods for forming a transparent electrode on a color filter have been proposed hitherto as disclosed in Japanese Patent Unexamined Publication No. 61-233720, Japanese Patent Unexamined Publication No. 61-260224, Japanese Patent Unexamined Publication No. 61-198131 or Japanese Patent Unexamined Publication No. 62-153826.

However, in the aforementioned prior art, color filters and protective layers are formed from organic resins for easy formation of fine patterns. Because the heat resistance of these organic resins is low (approximately 220° C. to 230° C. at highest), when the transparent electrode is formed either directly on the color filter or on the protective layer, the processing temperatures cannot be raised at the time of coating and this leads to an undesirably weak film quality for the transparent electrode film material. This in turn leads to the undesirable property of low surface hardness, and hence an unsatisfactory physical strength. Also an electric corrosion reaction is induced when an electric field is applied in an environment where an electrolyte such as water exists. These problems manifest themselves as low reliability for the electro-optic device. Because of this, a method for pigmenting a color filter formed through a dyeing process hitherto is employed for enhancing the heat resistance of the color filter itself, however, the problem is inherent in the heat resistance of the holding resin itself, and hence an improvement is not realizable.

An attempt to enhance the heat resistance of the resin has been unsuccessful because problems, such as short wavelength light being absorbed act to turn the resin yellow. Also the resistance of the electro-optic device to alkali is reduced when heat resistance enhanced resins are used.

Alternatively a method for forming the color filter by sublimiting a substance with high heat resistance such as pigment into a porous inorganic layer has been proposed. However, there yet remain problems with pattern precision and color purity which are unsolved.

What is desirable is to provide an electro-optic device having a transparent electrode on a color filter directly, or through a single or plural organic or inorganic layer, which has improved chemical durability, particularly a high resistance to electric corrosion reactions and is generally high in reliability.

SUMMARY OF THE INVENTION

Accordingly, the present invention provides for encapsulating a color filter in a protective coating, forming a transparent electrode on the planar surface of the protective coating and forming an orientation film over the transparent electrode wherein the orientation film extends beyond the boundary defined by the seal between the two substrates of a liquid crystal device.

The planar surface of the protective coating is obtained in one of two ways. One method is to planarize the color filter layer in which case the protective coating will conform to the existing planar surface. A second method is to apply the protective coating layer over a non-planarized color filter layer and then mechanically planarize the protective coating layer.

The seal itself can be attached at one of its ends to the orientation film, as shown in FIGS. 2 and 4, or it can be attached at one of its ends to a portion of the transparent electrode such that that end is surrounded by the abutting orientation film, as shown in FIG. 6. In both of the seal attachment schemes described above, the other end of the seal is attached directly to one of the substrates. Typically the substrates are glass substrates and the seal is a thermosetting type epoxy resin or an ultraviolet-curing type epoxy-acrylic resin.

There are typically two opposing glass substrates, which may be called an upper substrate and a lower substrate, used in the production of the electro-optic device of the present invention. A portion of the orientation film on the substrate having the color filter, the lower substrate for example, is formed so that it extends outside the region which underlies the opposing, or upper substrate. In other words, the orientation film extends beyond the area defined by the overlap of the two substrates.

The extended portion of the orientation layer may function as a protective layer for the signal input portion of the transparent electrode. Thus electric corrosion reactions are prevented and disconnection of the transparent electrode, (i.e. formation of electrical opens) is thereby avoided, and reliability is enhanced. Electrical opens involving the transparent electrode may result from the combination of ionic deposits sticking when the electro-optic device is formed, water content left over from the cleaning processes of manufacturing and the electric fields applied at the time of operation.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 6 is a drawing showing the structure of an electro-optic device described in Example 4 below.

FIG. 7 shows an assembled liquid crystal display panel having signal input electrodes on two sides.

DETAILED DESCRIPTION OF THE INVENTION

Figure 1:
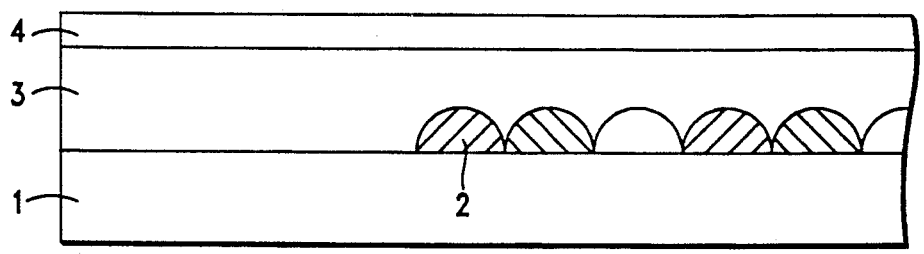
FIG. 1 is a cross-sectional view of a substrate with the color filter described in Example 1 below.

The present invention will now be described in detail with reference to the figures, wherein like reference numerals refer to like parts throughout the figures. Several examples are presented for the purpose of illustrating the present invention.

EXAMPLE 1

This Example is discussed with reference to FIGS. 1 and 2.

Figure 2:
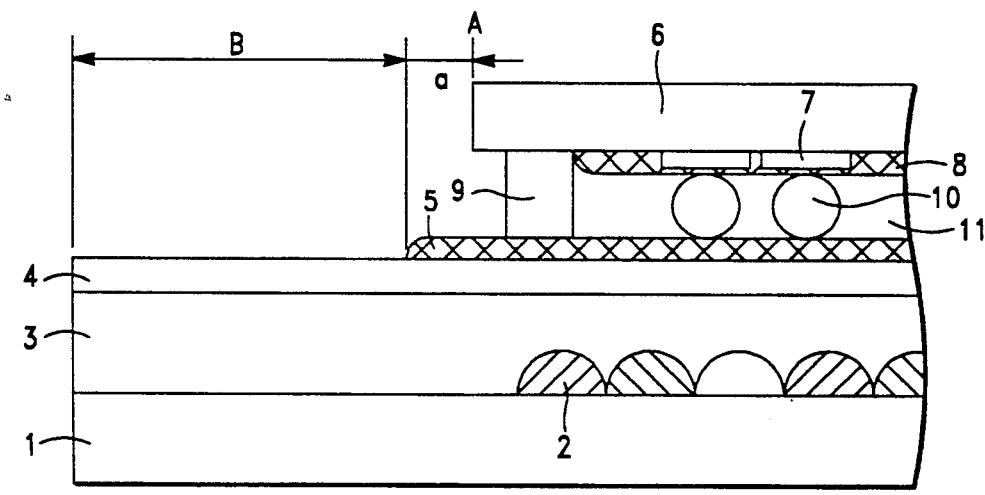
FIG. 2 is a drawing showing a structure of an electro-optic device described in Example 1 below.

A cross-sectional view of a substrate with the color filter according to the present invention is shown in FIG. 1. Color filter 2 is formed on glass substrate 1 by printing an ink in which each pigment of red, blue and green is dispersed in stripes approximately 1.5 μm in thickness through an offset process. Then an acrylic resin about 10 μm in thickness is formed through a screen printing process. This is ground to flatten, or smooth out, the surface and then dried at approximately 180° C. for two hours, to form protective layer 3 on the surface of glass substrate 1.

A clear conductive film consisting of indium oxide-tin oxide (ITO) approximately 2,000 Å thick is formed on protective layer 3 of glass substrate 1 at approximately 180° C. by means of cold magnetron sputtering, and transparent electrode 4 is formed by means of photolithography.

Counter electrodes 7 of ITO are formed on glass substrate 6 and arranged in a matrix-type pattern. Thereafter orientation films 5, 8 are formed of polyimide with a thickness of about 300 Å to 400 Å each. Liquid crystal 11 is sealed between opposing substrates 1, 6 by means of seal 9. Gap material 10 is similarly sealed between opposing substrates 1, 6.

In the present embodiment, the angle of torsion is 230° left, and the cell gap is 6 μm. In this case, orientation film 5 of substrate 1 is formed extending outwardly by an amount a from edge A where it overlaps with the opposite substrate 6. The extension of orientation film 5 beyond the area of substrate overlap, is limited such that a portion B of signal input electrode 4, as shown in FIG. 2, is left uncovered by orientation film 5.

Experiments were conducted to determine the best values for a. The procedures and results are presented below.

First, the electro-optic device charged with a liquid crystal was washed in an organic solvent such as triethane or the like, and was then brushed in an alkali water (2 to 4 wt %) for removing any stain sticking to the signal input portion. Subsequently, a waveform driven in a time sharing fashion was applied at duty cycle of 1/200 to 1/400, and a continuous driving test was carried out under the environmental conditions of 50° C.-90 RH % for 200 hours to investigate the occurrence of disconnection and other faults. Samples were extracted at every 50 hours to check the number of disconnections and the particulars surrounding those failures.

The results are shown in TABLE 1. The number of lines is standardized at 200 pieces for this test. With respect to washing the electro-optic device, it may be washed on ultrasonic waves in an alkaline surface active agent. The only limitations on washing techniques are that the signal input portion and other parts not be damaged physically, and that the seal, the protective layer and other parts not be damaged chemically by a washing agent. In this example, brushing was carried out in an alkali water (2 to 4 wt %) by a nylon rotary brush. To avoid flaws that may result from brushing, the rotary brush is applied moderately so as to keep its hairs touching lightly.

TABLE 1

| | Continuous Driving Test Result |
|---|---|
| Length of portion a | Number of disconnections (Number of corrosions) |
| −1.0 mm | 5 disconnections (50 Hours) |
| −0.5 mm | 6 disconnections (50 Hours) |
| ±0 mm | 0 |
| +0.5 mm | 0 |
| +1.0 mm | 0 |

From the results of TABLE 1, it can be seen that beneficial effect of the present invention is realized even if the position of the orientation film comes to a position equal to edge A. However, because of the need to account for manufacturing tolerances, an extension of the orientation layer beyond edge A by approximately 0.5 mm to 1.0 mm is found to be effective.

While polyimide is employed as the orientation film in the present embodiment, other orientation agents such as, preimide (i.e. polyimide precursor), polyamic acid, polyamide-imide or the like may be used.

EXAMPLE 2

This Example is discussed with reference to FIGS. 3 and 4.

Figure 3:
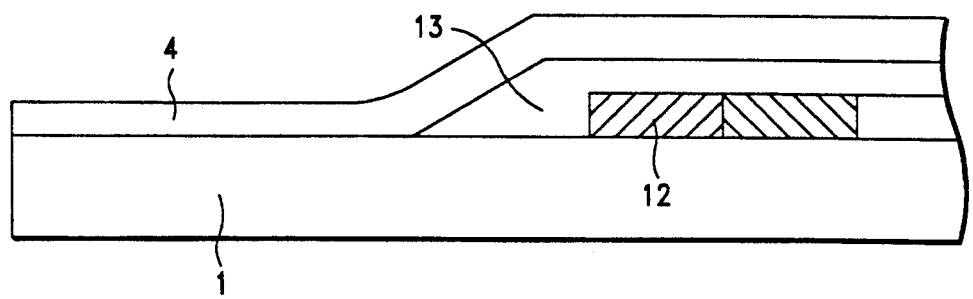
FIG. 3 is a cross-sectional view of a substrate with the color filter described in Example 2 below.
Figure 4:
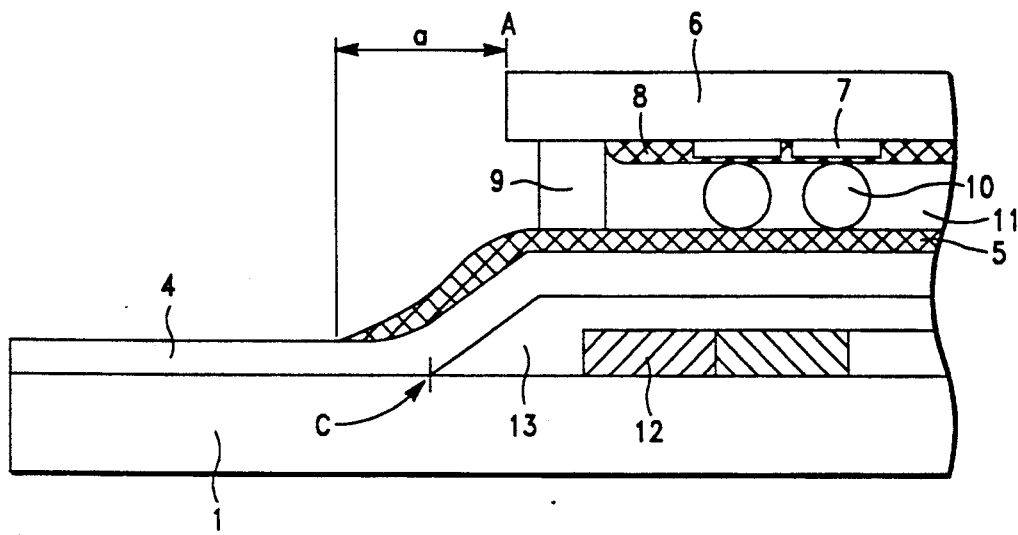
FIG. 4 is a drawing showing the structure of an electro-optic device described in Example 2 below.

A cross-sectional view of a substrate with a color filter according to the present invention is shown in FIG. 3. As in the case of Example 1, a color filter is printed in stripes on glass substrate 1 through offset printing, and then color filter 12 is pressed and flattened. Next, an ultraviolet photosensitive opoxy acrylate resin is coated to a thickness of approximately 1.2 μm by means of spin coating. Irradiation by ultraviolet rays follows to selectively obtain protective layer 13. Transparent electrode 4 is then formed just as in Example 1. Construction of the remainder of the electro-optic device can be seen with reference to FIG. 4.

As in the case of Example 1, a study was made in consideration both of the position A of orientation film 5 and of end position C of protective layer 13. The electro-optic device was washed and tested in the same way as in Example 1 so as to provide for an easy comparison of results.

The results are given in TABLE 2. As for the position C, "in", indicates inside of seal 9 and "out(±0)", indicates that the position of point C is approximately 0 mm from edge A.

TABLE 2

| | Continuous Driving Test Result | |
|---|---|---|
| Length of portion a | Position of portion C | Result |
| −0.5 mm | in | 1 pcs (50 Hours) |
| + | out (±0) | 5 pcs (50 Hours) |
| ±0 mm | in | 0 |
| + | out (±0) | 0 |
| +0.5 mm | in | 0 |
| + | out (±0) | 0 |

As will be apparent from the results in TABLE 2, when the boundary of protective layer 13 is unprotected from contact with the open air (outside of seal 9), the ITO strength is not satisfactory and an electric corrosion reaction may easily occur. It is understood that the beneficial effect of the present invention will be achieved if orientation film 5 extends at least to edge portion A even in this case. Further, the thickness of the liquid crystal can easily be controlled by forming protective layer 13 preferably as far as a position coming under seal 9, and thus the degree of freedom with respect to the position of protective layer 13 will increase according to the method of the present invention.

Notwithstanding, the description given all in Examples 1 and 2, the structure of the present invention is not limited to the described color filter forming methods or the materials used to form the protective layer. Electro-deposition, dispersing pigments into polyimide-type substrates, and dispersing pigments into ultraviolet photosensitive substrates are all ways of forming the color filter and all may use the structure of the present invention. The protective layer may be made from other materials such as thermosetting melamine resin, epoxy resin, silicone resin and the like.

Figure 8:
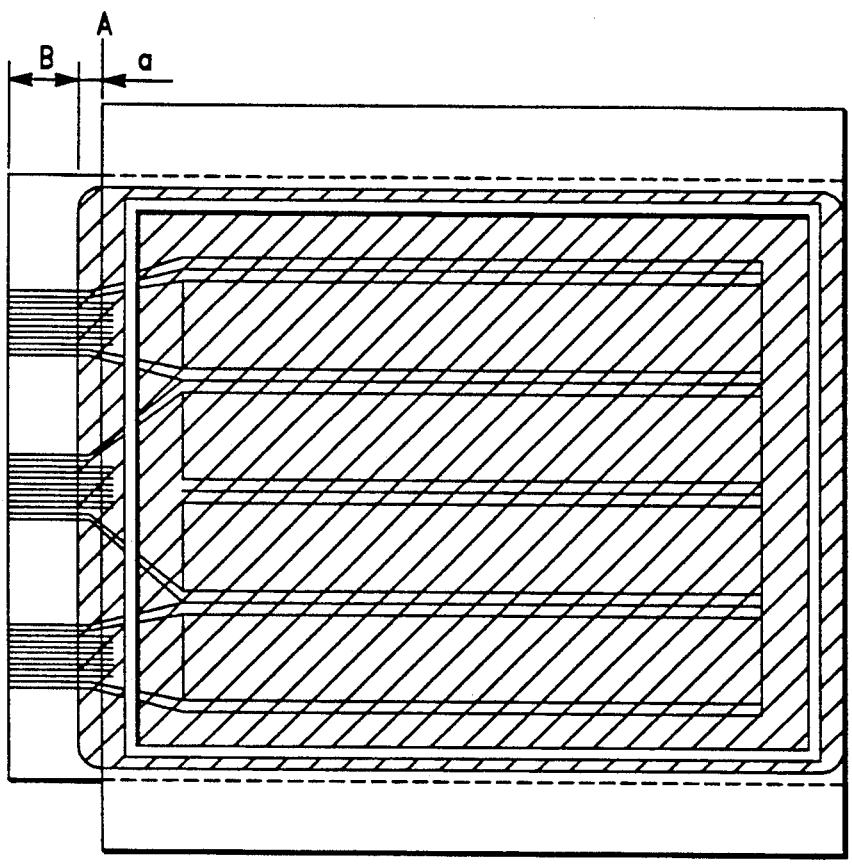
FIG. 8 shows an assembled liquid crystal display panel having signal input electrodes on one side.

Input signal electrodes are sometimes provided on two sides of a substrate, as shown in FIG. 7, so that by driving a signal from both ends of a particular line, that line presents a smaller effective resistance. FIG. 8 illustrates the case of signal input electrodes being provided on only one side of a substrate. If signal input electrodes are formed on two sides of a substrate, then the orientation film extension of the present invention may likewise be formed on those two sides. Of course, on the sides of the substrate where signal input electrodes are not provided, the orientation film does not need to be extended beyond the substrate overlap area.

EXAMPLE 3

Figure 5:
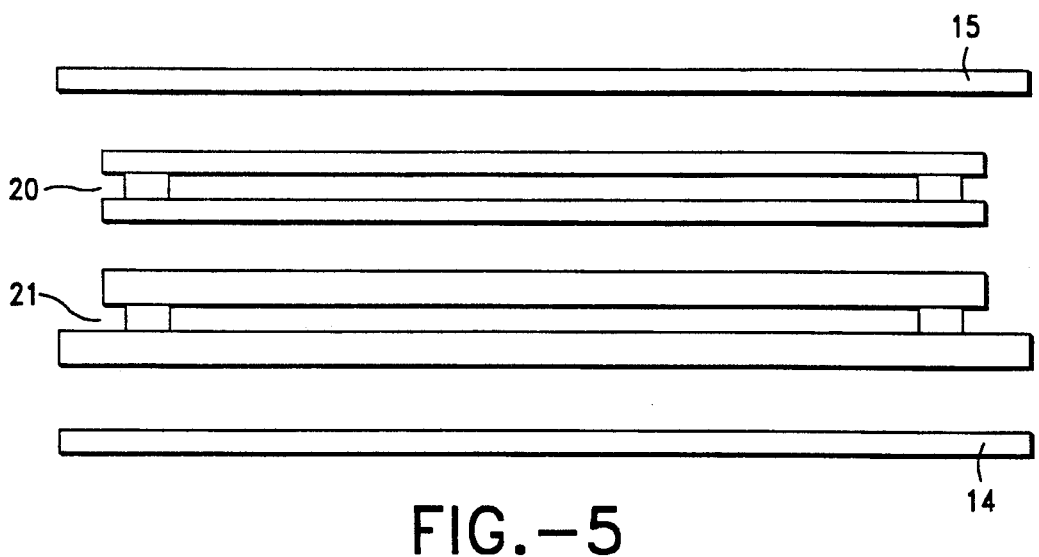
FIG. 5 is a drawing showing the structure of an electro-optic device described in Example 3 below.

This Example is discussed with reference to FIG. 5.

With the electro-optic device described in Examples 1 and 2 as a dimming cell 21, an optical anisotropic body 20 having the same optical characteristic as the dimming cell 21 (a value of the product $d \times \Delta n$ of a cell gap d and a refractive index anisotropy $\Delta n$ of the liquid crystal or the optical anisotropic body being same) is provided between polarizers 14, 15. A dimming cell is a liquid crystal cell capable of controlling the transmission of light through that cell.

In the present example, a liquid crystal such as dimming cell 21 is formed to have a reverse torsion (right) but in the same cell gap, an angle formed by orientations of the interface of dimming cell 21 and optical anisotropic body 20 is 90°, and an angle formed by the polarized axis of each polarizer and each orientation of the electrooptic device 21 and the optical anisotropic body 20 is adjusted to 20° to 50° so as to have white at the time of all lighting, then an electro-optic device high of contrast and capable of indicating white and black can be formed. A similar effect is obtainable by using a film as the optical anisotropic body.

EXAMPLE 4

This Example is discussed with reference to FIG. 6.

After preparing substrate 1 with a color filter as in the case of Example 1, counter electrodes 7 of ITO are formed as a matrix on glass substrate 6. Polyimide orientation films 5, 8 of 300 Å to 400 Å thickness are then formed in regions other than where seal 9 will be attached. In this way, seal 9 is actually attached to the transparent electrode and is surrounded by the abutting orientation film 5. Liquid crystal 11 is sealed between substrates 1, 6 by means of seal 9. Gap material 10, is similarly sealed between substrates 1, 6 thereby completing the electro-optic device.

As in Example 1, the length of portion a is changed, the electrooptic device is washed in an organic solvent such as triethane or the like, next brushed in an alkali water (2 to 4 wt %) to remove any stain sticking to the signal input portion. As in Example 1, the results of experiments show that to achieve prevention of electrical corrosion reactions, the orientation film should be extended beyond the area of substrate overlap about 0.5 mm to about 1.0 mm onto the signal input portions of the transparent electrodes.

As described in the present embodiment, from forming the orientation films concurrently on the seal side and the terminal side round the region where the upper and lower substrates overlap at least, a portion where a reaction of electric corrosion is easy to arise is protected, thus obtaining a similar effect to Example 1.

In the present embodiments, while polyimide is discussed as the orientation film, materials such as, polyamide-imide, rhombic $SiO_2$ and the like may be used. The thicker the orientation film, the better the performance that can be expected with respect to prevention of contact with atmospheric air, and hence it is preferable that the thickness be at least 50 Å, and even more preferably at least 200 Å.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the subjoined claims.

What is claimed is:

1. A liquid crystal display apparatus comprising:
a) a first substrate;
b) a color filter;
c) a protective layer;
d) a transparent electrode;
e) a first orientation film;
f) at least one seal; and
g) a second substrate;

wherein said color filter is disposed upon a surface of said first substrate, said protective layer is formed on said first substrate over said color filter, said transparent electrode is formed on top of said protective layer, said first orientation film is formed on top of said transparent electrode such that a portion of said transparent electrode remains exposed, said seal is mounted on said first orientation film offset laterally inward from an edge of said first orientation film and said second substrate extends beyond the position of said seal.

2. The apparatus of claim 1 wherein said color filter is flattened.

3. The apparatus of claim 1 wherein said protective layer is planarized.

4. The apparatus of claim 1 wherein said protective layer is comprise of an acrylic resin.

5. The apparatus of claim 1 wherein said protective layer is comprised of an ultraviolet photosensitive epoxy acrylate resin.

6. The apparatus of claim 1 wherein said transparent electrode is comprised of indium-tin-oxide.

7. The apparatus of claim 1 wherein said first orientation layer is comprised of a material selected from the group consisting of preimide, polyamic acid and polyamide-imide.

8. The apparatus of claim 1 wherein said first orientation layer is comprised of polyimide.

9. The apparatus of claim 1 wherein said first substrate is a glass substrate.

10. The apparatus of claim 1 wherein said second substrate is a glass substrate.

11. The apparatus of claim 1, wherein said first orientation film extends beyond said second substrate by an amount in the range of approximately 0.5 mm to 1.0 mm.

12. A liquid crystal display apparatus comprising:
 a) a first substrate;
 b) a color filter;
 c) a protective layer;
 d) a transparent electrode;
 e) a first orientation film;
 f) at least one seal; and
 g) a second substrate;
wherein said color filter is disposed upon a surface of said first substrate, said protective layer is formed on said first substrate over said color filter, said transparent electrode is formed on top of said protective layer, said first orientation film is formed on top of said transparent electrode such that a portion of said transparent electrode remains exposed, said seal is mounted on said transparent electrode such that said first orientation layer abuts one end of said seal, said second substrate is mounted on top of said seal such that a portion of said second substrate extends beyond the position of said seal, and wherein said first orientation film extends beyond said second substrate by an amount in the range of approximately 0.5 mm to 1.0 mm.

13. The apparatus of claim 12 wherein said color filter is flattened.

14. The apparatus of claim 12 wherein said protective layer is planarized.

15. The apparatus of claim 12 wherein said protective layer is comprise of an acrylic resin.

16. The apparatus of claim 12 wherein said protective layer is comprised of an ultraviolet photosensitive epoxy acrylate resin.

17. The apparatus of claim 12 wherein said transparent electrode is comprised of indium-tin-oxide.

18. The apparatus of claim 12 wherein said first orientation layer is comprised of a material selected from the group consisting of preimide, polyamic acid and polyamide-imide.

19. The apparatus of claim 12 wherein said first orientation layer is comprised of polyimide.

20. The apparatus of claim 12 wherein said first substrate is a glass substrate.

21. The apparatus of claim 12 wherein said second substrate is a glass substrate.

* * * * *